US009682846B2

(12) United States Patent
Mathiasen

(10) Patent No.: US 9,682,846 B2
(45) Date of Patent: Jun. 20, 2017

(54) WIND TURBINE TOWER WITH AN ELEVATOR SYSTEM

(71) Applicant: SIEMENS AKTIENGESELLSCHAFT, München (DE)

(72) Inventor: Soeren Oestergaard Mathiasen, Give (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/851,567

(22) Filed: Sep. 11, 2015

(65) Prior Publication Data

US 2016/0195067 A1    Jul. 7, 2016

(30) Foreign Application Priority Data

Dec. 11, 2014   (EP) .................................... 14197423

(51) Int. Cl.

| | |
|---|---|
| *B66B 9/00* | (2006.01) |
| *B66B 7/02* | (2006.01) |
| *F03D 80/80* | (2016.01) |
| *F03D 13/20* | (2016.01) |
| *B66B 11/02* | (2006.01) |
| *F03D 13/10* | (2016.01) |
| *F03D 80/50* | (2016.01) |

(52) U.S. Cl.
CPC .................. *B66B 9/00* (2013.01); *B66B 7/02* (2013.01); *B66B 11/02* (2013.01); *F03D 13/10* (2016.05); *F03D 13/20* (2016.05); *F03D 80/50* (2016.05); *F03D 80/88* (2016.05); *Y02E 10/728* (2013.01)

(58) Field of Classification Search
CPC .......... F03D 1/001; F03D 1/003; F03D 13/20; F03D 80/88; B66B 9/00; B66B 7/02; B66B 11/02
USPC ................................................ 52/30; 187/401
See application file for complete search history.

(56) References Cited

U.S. PATENT DOCUMENTS

| | | | | |
|---|---|---|---|---|
| 259,951 | A | * | 6/1882 | Voerde ...................... B66B 5/20 187/375 |
| 3,127,998 | A | * | 4/1964 | Zell ......................... B66C 13/00 414/264 |

(Continued)

OTHER PUBLICATIONS

Extended European Search Report for EP Application No. 14197423.8, maield on May 21, 2015.

*Primary Examiner* — Brent W Herring
(74) *Attorney, Agent, or Firm* — Schmeiser Olsen & Watts LLP

(57) ABSTRACT

A wind turbine tower with an elevator system and a method to install the elevator system is provided. The tower for a wind turbine comprises includes an elevator system including guide wires. The guide wires are connected to a guide wire fixture arrangement. The tower includes a platform that is arranged in the area of the lower end of the tower. The platform comprises an opening to allow the guide wires to pass through the opening. The platform includes a connection means, to detachably connect the guide wire fixture arrangement to the platform during transportation and installation of the tower. The platform includes a hoist system to lower the guide wire fixture arrangement through the opening in the platform into a space below the tower to extend the guide wires through the opening in the platform.

10 Claims, 4 Drawing Sheets

(56) References Cited

U.S. PATENT DOCUMENTS

| | | | | |
|---|---|---|---|---|
| 3,763,964 | A * | 10/1973 | Davis | B66B 9/187 187/239 |
| 5,169,593 | A * | 12/1992 | Kazirskis | G21C 19/207 376/260 |
| 5,230,404 | A * | 7/1993 | Klein | B66B 19/00 187/414 |
| 5,570,546 | A * | 11/1996 | Butterworth | E04H 12/34 343/890 |
| 6,131,703 | A * | 10/2000 | Gates | B66B 5/26 187/351 |
| 7,225,902 | B2 * | 6/2007 | Hashiguchi | B66B 7/04 187/401 |
| 7,877,935 | B2 * | 2/2011 | Ollgaard | E04H 12/08 52/153 |
| 8,051,609 | B2 * | 11/2011 | Olgaard | E04H 12/08 52/153 |
| 8,256,164 | B2 * | 9/2012 | Cuccurullo | E04D 13/0335 256/65.02 |
| 2009/0016897 | A1 * | 1/2009 | Olgaard | E04H 12/08 416/244 R |
| 2011/0083376 | A1 * | 4/2011 | Cuccurullo | E04D 13/0335 52/20 |
| 2011/0088331 | A1 * | 4/2011 | Olgaard | E04H 12/08 52/40 |
| 2013/0174509 | A1 * | 7/2013 | Reed | E04H 12/08 52/655.1 |
| 2014/0130420 | A1 * | 5/2014 | Talonen | B66B 9/00 52/30 |
| 2014/0216169 | A1 | 8/2014 | Romo et al. | |
| 2016/0169192 | A1 * | 6/2016 | Aranzadi De Miguel | F03D 1/001 52/30 |

* cited by examiner

WIND TURBINE TOWER WITH AN ELEVATOR SYSTEM

CROSS-REFERENCE TO RELATED APPLICATIONS

This application claims priority to European Application No. EP 14197423.8, having a filing date of Dec. 11, 2014, the entire contents of which are hereby incorporated by reference.

FIELD OF TECHNOLOGY

The following relates to a wind turbine tower with an elevator system and a method to install the elevator system.

BACKGROUND

A wind turbine comprises a rotor, with rotor blades and a rotor hub. The rotor hub is rotatable connected to a nacelle. The nacelle is arranged on a tower in a way that the nacelle is able to perform a yaw movement.

The tower of the wind turbine is connected to a foundation. Wind turbines can be installed onshore and offshore. An offshore installation requires a specialized installation vessel, to transport the parts of the wind turbine to the installation site.

First, the foundation is installed at sea. Then the tower is connected to the foundation, and the nacelle, the hub and the rotor blades are installed. The parts need to be shipped to the installation site and need to be lifted by a crane on the installation vessel.

The operation of the installation vessel is expensive and the costs are calculated by the installation time needed. Thus, the number of parts to be installed is minimized and the parts of the wind turbine are preinstalled.

The higher the level of the preparation of the parts, the less installation time is needed on sea. The tasks, that need to be performed at sea during the installation, are mainly to connect the parts of the wind turbine and install the arrangements that lead from one part to the neighboring part of the wind turbine.

It is known to install an elevator in the tower of a wind turbine. The elevator is used for personnel and parts during installation, maintenance and service. It is also known to install an elevator that connects the tower and the foundation of the wind turbine.

The tower is lifted by crane from the vessel and is connected to the foundation. After the installation of the main parts of the wind turbine, the elevator is installed in the tower of the wind turbine and in the foundation. The elevator needs to be adjusted, tested, and approved for the transportation of personnel and parts.

The installation of the elevator needs installation time and thus increases the costs of installation of the wind turbine.

Embodiments of the invention provide an improved elevator and method of installation.

SUMMARY

A tower for a wind turbine is disclosed. The tower comprises an elevator system and the elevator system comprises guide wires to guide an elevator cabin. The guide wires are connected to a guide wire fixture arrangement.

The tower comprises a platform that is arranged vertical to the longitudinal axis of the tower in the area of the lower end of the tower. The platform comprises an opening that is prepared and arranged in a way to allow the guide wires to pass through the opening.

The platform comprises connection means to detachably connect the guide wire fixture arrangement to the platform during transportation and installation of the tower.

The platform comprises a hoist system to lower the guide wire fixture arrangement through the opening in the platform into a space below the tower, to extend the guide wires through the opening in the platform.

A tower for a wind turbine is installed on a foundation. In an offshore installation situation, the foundation can include for example a mono-pile or a tripod, and a transition piece.

The tower comprises an elevator system for the transportation of people or parts inside of the tower. The elevator system comprises an elevator cabin that is connected to guide wires.

The guide wires are installed inside of the tower and are connected at the upper part of the tower and the lower part of the tower. The guide wires show a certain tension to allow the elevator cabin to be guided along the guide wires.

During the installation of the tower, the elevator system is installed inside of the tower and the guide wires are set to the right tension, the elevator system is tested and approved.

At the lower end of the tower, the guide wires are connected to a guide wire fixture arrangement.

The tower comprises a platform that is arranged vertical to the longitudinal axis of the tower in the area of the lower end of the tower. After the installation of the tower, the platform is used by personnel during service and maintenance in the tower.

The tower can comprise several platforms, where by one platform is installed in the area of the lower end of the tower.

After the tower is set up in an upright position and is connected to a foundation, the area of the tower that is close to the connection to the foundation is the lower end of the tower.

The area of the lower end of the tower might include the first 20 m of the tower seen from the lower end of the tower that is connected to the foundation.

The platform comprises an opening to allow the guide wires to pass through the opening. After the installation of the elevator system and during the use of the elevator, an elevator cabin can pass through the opening in the platform. The platform comprises connection means to detachably connect the guide wire fixture arrangement to the platform during transportation and installation of the tower.

The lower end of the guide wires is connected to the guide wire fixture arrangement. The guide wire fixture arrangement needs to be connected to the tower during transportation and installation to avoid damages.

The platform comprises a hoist system to lower the guide wire fixture arrangement through the opening in the platform into a space below the tower to extend the guide wires through the opening in the platform. During transportation and installation of the tower, the guide wire fixture arrangement is connected to the platform in the tower.

After the installation of the tower, the guide wire fixture arrangement is detached from the platform in the tower and is lowered through the opening in the platform using the hoist system.

The hoist system is connected to the platform in the tower and comprises lifting means, for example a wire that is connected to the guide wire fixture arrangement. By operating the hoist system, the guide wire fixture arrangement can be lowered through the opening in the platform into the space below the platform, thus also into the space below the tower, to extend the guide wire through the opening in the platform.

The guide wire fixture arrangement can then be connected to the foundation of the tower. Thus, the guide wires of the elevator system reach through the opening in the platform of the tower to the space below the tower, thus into the space inside of the foundation. Thus, the elevator system is extended into the foundation.

An elevator frame is connected to the guide wire fixture arrangement.

The guide wire fixture arrangement comprises an elevator frame. The elevator frame defines and secures the space needed for the elevator system in the area of the guide wire fixture arrangement. Thus, the guide wire fixture arrangement can also be used as the lower part of the elevator system to secure the elevator cabin.

A protection railing is arranged at least partially around the opening in the platform.

The platform inside the tower is used by personnel during service and maintenance. Thus, the opening in the platform in the tower is a potential security problem for the personnel. A railing is installed around the opening in the platform to avoid personnel from falling through the opening in the platform.

The guide wire fixture arrangement comprises attachment points that are prepared and arranged in a way to be used with the connection means to attach the guide wire fixture arrangement to a second platform to tension the guide wires.

After the installation of the tower, the guide wire fixture arrangement is lowered through the opening in the platform by the hoist system and is then attached to a second platform that is present in the foundation of the wind turbine tower to finish the installation of the elevator system in the tower.

By connecting the guide wire fixture arrangement to the second platform, the guide wires are set to the right tension and the elevator system is ready to be used.

Thus, the installation of the elevator system after the installation of the tower can be performed very quickly.

A method is disclosed to install a tower of a wind turbine.

The tower comprises an elevator system and the elevator system comprises guide wires to guide an elevator cabin. The guide wires are connected to a guide wire fixture arrangement. The tower comprises a platform that is arranged vertical to the longitudinal axis of the tower in the area of the lower end of the tower. The platform comprises an opening that is prepared and arranged to allow the guide wires to pass through the opening. The platform comprises connection means to detachably connect the guide wire fixture arrangement to the platform during transportation and installation of the tower. The platform comprises a hoist system to lower the guide wire fixture arrangement through the opening in the platform into a space below the tower to extend the guide wires through the opening in the platform. The method comprises the steps of disconnecting the guide wire fixture arrangement from the tower and lowering the guide wire fixture arrangement through the opening in the tower.

A tower for a wind turbine is installed on a foundation. The tower comprises the features as described above.

The method comprises the additional steps of temporarily connecting the tower to a support arrangement and connecting the guide wire fixture arrangement to the support arrangement.

At an offshore installation situation, the installation of the tower on the foundation is performed by a specialized installation vessel. The vessel comprises a crane that lifts the tower onto the foundation.

The tower is then connected to the foundation and the installation of the elevator system can be performed. Before the elevator system can be used, the guide wires of the elevator system need to be set to the right tension, so that they can be used to guide the elevator cabin, and the elevator system needs to be tested and approved.

This takes up a lot of installation time at the offshore side of the wind turbine. To avoid this additional installation time for the elevator system, the tower is set up on top of a support arrangement onshore before it is transported to the offshore foundation.

The support arrangement is a copy of an upper part of a foundation at an offshore wind turbine site.

The tower is lifted onto the support arrangement by a crane and is connected to the support arrangement. The guide wires of the elevator system that are connected to the guide wire fixture arrangement are lowered through the opening in the platform of the tower to reach into the support arrangement.

The guide wire fixture arrangement is there connected to a connection point inside of the support arrangement that is arranged in the same distance to the platform in the tower than the final connection point in the foundation of the wind turbine.

Thus, the installation situation of the elevator system can be simulated onshore.

The guide wire fixture arrangement is connected to the support arrangement and the guide wires can be set into the right tension.

Thus, the elevator system can be tested and approved onshore.

The method comprises the additional step of adjusting the length of the guide wires to achieve a certain predetermined tension of the guide wires.

The guide wire fixture arrangement is connected to the support structure of the tower, whereby the guide wires reach through the opening in the platform of the tower and through the tower.

The guide wires of the elevator system are later used to guide the elevator cabin of the system.

For the test and approval of the elevator system, the guide wires need to be adjusted to achieve a certain predetermined tension of the guide wires.

After the tension is adjusted, the guide wires are fixed in their length in the tower, from the top of the tower down to the guide wire fixture arrangement.

The method comprises the additional step of testing and approving the elevator system of the tower.

The test and approval of the elevator system is performed at a simulated installation situation of the wind turbine tower on top of the support arrangement at an onshore site.

Thus, less offshore installation time is needed for the test and approval of the elevator system. The installation time spent at an onshore simulated installation situation is less expensive than the offshore installation time.

Thus, the installation of the wind turbine is cheaper when the test and approval of the elevator system is performed onshore.

The method comprises the additional steps of disconnecting the guide wire fixture arrangement from the support arrangement, hoisting the guide wire fixture arrangement up to the tower by the hoist system, and attaching the guide wire fixture arrangement to the tower.

After the installation of the elevator system and the test and approval, the guide wire fixture arrangement with the guide wires is disconnected from the support arrangement, and is hoisted up to the platform in the tower.

The guide wire fixture arrangement is there connected to the platform inside of the tower. The tower is then disconnected from the support arrangement and is prepared for transportation and installation offshore. The tower then comprises the pre-installed elevator system with the guide wires set to the right tension, and the guide wire fixture arrangement being temporarily connected to the platform inside of the tower.

The method comprises the further steps of transporting the tower to an installation site of a foundation, and connecting the tower to the foundation.

The tower including the preinstalled elevator system is transported to the offshore installation site of the wind turbine. There, a foundation is installed on the seafloor.

The tower is lifted from the specialized installation vessel by a crane onto the foundation at sea. The tower is then connected to the foundation.

The method comprises the additional steps of disconnecting the guide wire fixture arrangement from the tower and connecting the guide wire fixture arrangement to the foundation.

After the installation and connection of the tower to the foundation, the guide wire fixture arrangement is disconnected from the platform in the tower. The guide wire fixture arrangement is then lowered through the opening in the platform of the tower to the space below the platform.

There, the guide wire fixture arrangement is connected to the foundation, for example to a platform or a connection point inside of the foundation.

The distance between the platform inside of the tower, and the connection point or the platform to connect the guide wire fixture arrangement to the foundation, is the same as in the simulated installation situation onshore.

Thus, by connecting the guide wire fixture arrangement to the foundation, the guide wires achieve their predetermined tension again.

Thus, by connecting the guide wire fixture arrangement to the foundation, in the same distance from the platform in the tower than in the simulated installation situation, the same tension of the guide wires can be achieved as it was set in the installation situation onshore.

Thus, the elevator system inside of the tower is ready to be used. No further adjustment, testing, and approval of the elevator system are necessary.

Thus, the installation time for the elevator system is minimized, and the time for approval and testing of the elevator system is saved.

Thus, the costs for the installation of the wind turbine tower offshore are reduced.

The invention is shown in more detail by the help of figures. The figures show a preferred configuration and do not limit the scope of the invention.

BRIEF DESCRIPTION

Some of the embodiments will be described in detail, with reference to the following figures, wherein like designations denote like members, wherein.

DETAILED DESCRIPTION

Figure 1:
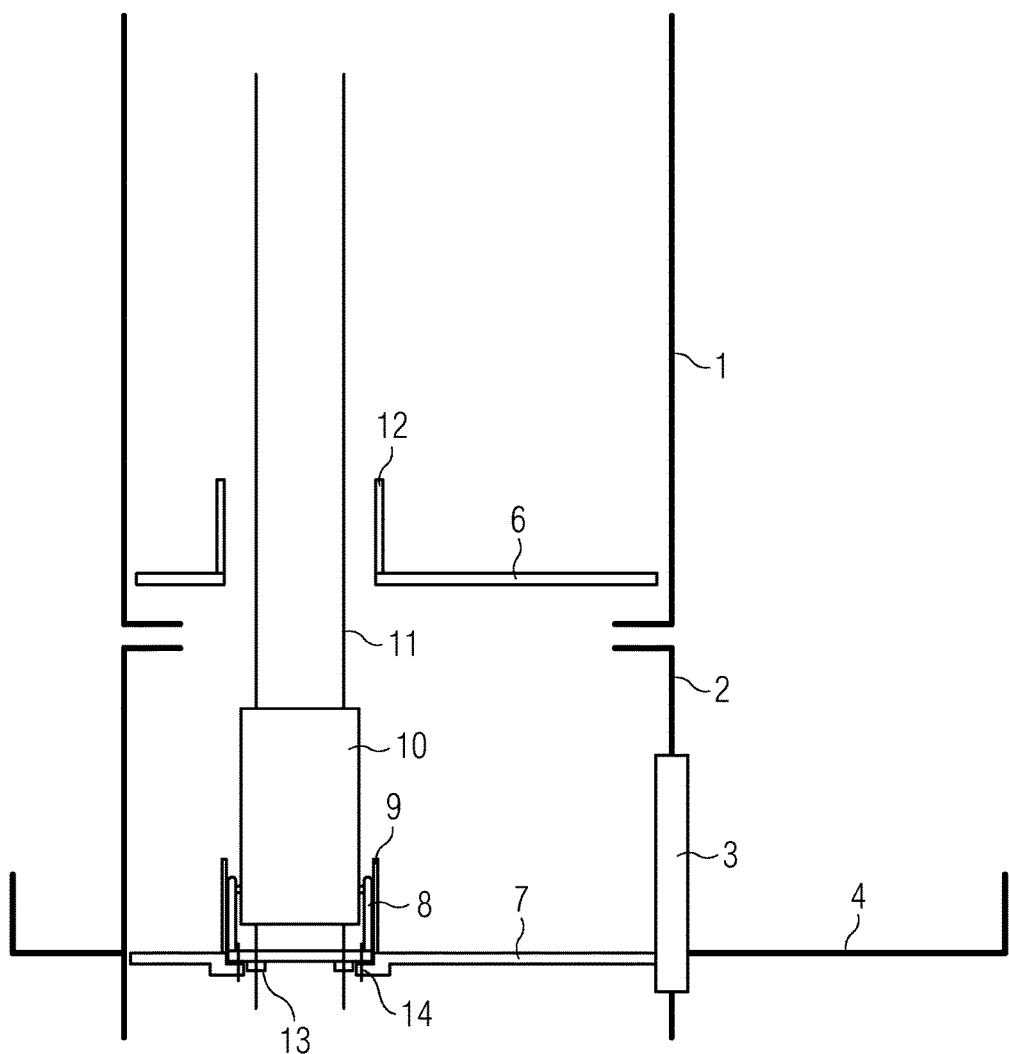
FIG. 1 shows an embodiment of an elevator system in a wind turbine tower.

FIG. 1 shows an elevator system in a wind turbine tower 1. The elevator system comprises an elevator cabin 10 that is connected to guide wires 11.

The lower end of the guide wires is connected to a guide wire fixture arrangement 13, and the upper end of the guide wires 11 is connected in the tower 1 of the wind turbine.

An elevator frame 8 is connected to the guide wire fixture arrangement 13.

The guide wires 11 of the elevator system need to be adjusted in their length and set to the right tension before the elevator can be used for the transportation of people or parts in the wind turbine tower.

The tower 1 is arranged on a support arrangement 2. The support arrangement 2 comprises a door 3, an outer platform 4 and an inner platform 7.

The support arrangement 2 is a dummy of a wind turbine tower foundation, to simulate the installation situation of the wind turbine tower 1 on an offshore foundation.

The support arrangement 2 comprises the same size and measures as the offshore foundation that is later used to support the tower 1.

The tower 1 is connected to the support arrangement 2, thus to the dummy foundation and the elevator system is installed inside the tower 1.

The guide wire fixture arrangement 13 is connected to the inner platform 7 of the support arrangement 2. The guide wires 11 are adjusted in their length and in their tension. The elevator system is then tested and approved for the transportation of people and parts within the tower 1.

The tower 1 comprises a platform 6, and the platform 6 comprises an opening that allows the elevator cabin and the guide wires to extend through the platform 6, from the tower 1 into the support arrangement 2.

The platform 6 is equipped with a protection railing 12, that is arranged around the opening in the platform 6. The guide wire fixture arrangement 13 is connected to the platform 7 in the support arrangement 2, a protection railing 9 is arranged around the elevator frame 8 and the guide wire fixture arrangement 13 on the platform 7 of the support arrangement 2.

Figure 2:
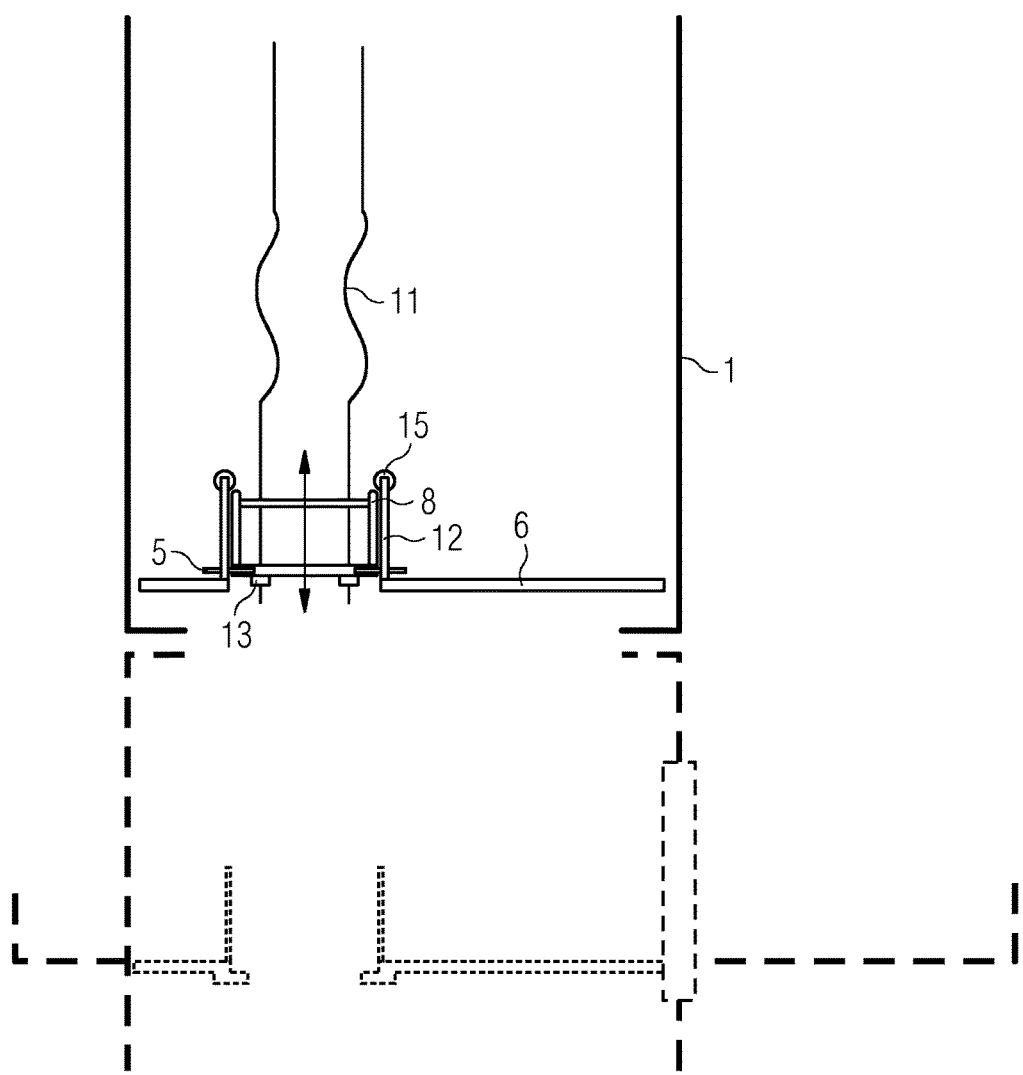
FIG. 2 shows an embodiment of the tower during the installation phase.

FIG. 2 shows the tower 2 during the installation of the tower. After adjustment of the guide wires and test and approval of the elevator system, the guide wire fixture arrangement 13 is disconnected from the platform 7 in the support arrangement.

The tower 1 comprises a hoist system 15 to hoist the guide wire fixture arrangement 13, including the elevator frame 8, up to the platform 6 in the tower 1. The guide wire fixture arrangement 13 is then connected to the platform 6 in the tower 1 by connection means 5.

The guide wires 11 are connected to the guide wire fixture arrangement 13 and the length of the guide wires 11 remains unchanged.

When the guide wire fixture arrangement 13 is lifted up to the platform 6, and is connected to the platform by the connection means 5, the guide wires 11 of the elevator system lose their tension and can be temporarily connected inside the tower, to be secured during the installation and the transportation of the tower.

The tower 1 is then disconnected from the support arrangement 2 and can be transported to the installation site of the wind turbine and can be installed to a foundation.

Figure 3:
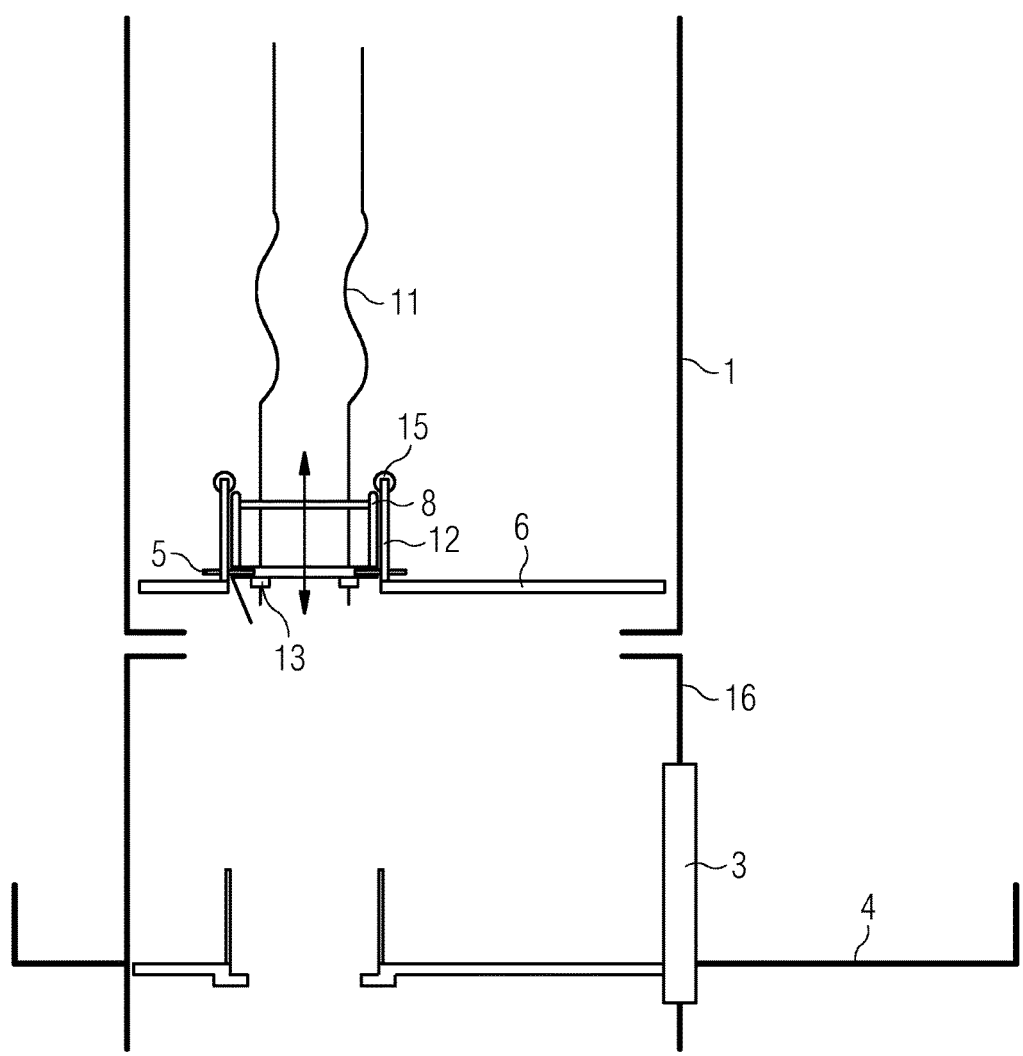
FIG. 3 shows an embodiment of the tower connected to the foundation.

FIG. 3 shows the tower 1 that is connected to the foundation 16. The tower 1 comprises the preinstalled elevator system, comprising the guide wires 11 and the guide wire fixture arrangement 13 that is connected to the floor 6 in the tower 1 by connection means 5.

The guide wire fixture arrangement 13 comprises an elevator frame 8. The floor 6 in the tower 1 comprises a railing 12.

A hoist system 15 is connected to the protection railing 12 to lower the guide wire fixture arrangement 13 and the elevator frame 8 through the opening in the platform 6 to the space below the tower 1.

The foundation 16 in the wind turbine comprises a door 3 and an outer platform 4. The foundation 16 has the same dimensions as the support arrangement 2 that was used to adjust the guide wires of the elevator system in the tower 1.

Figure 4:
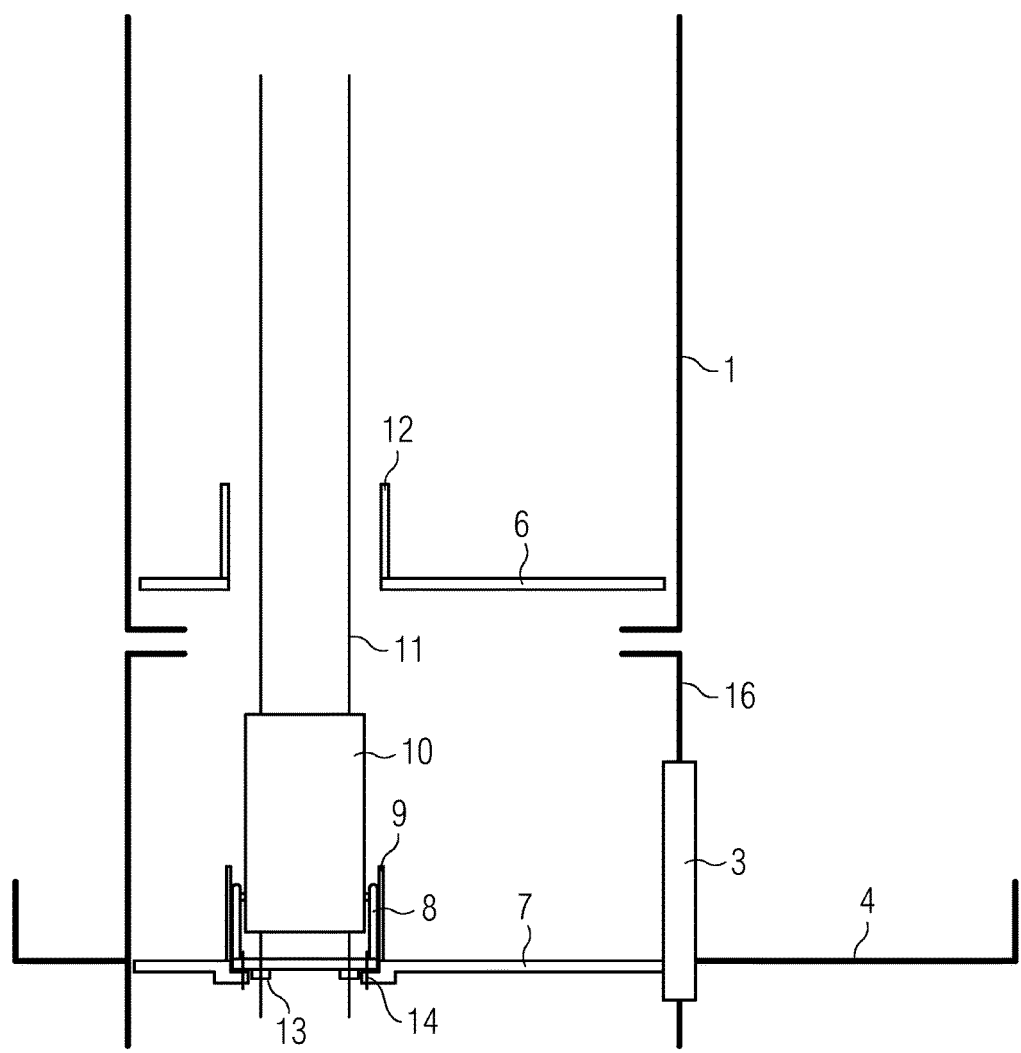
FIG. 4 shows an embodiment of the elevator system after the installation.

FIG. 4 shows the elevator system after the installation in the wind turbine tower 1. The wind turbine tower 1 is arranged on a foundation 16. The foundation 16 comprises a door 3, an outer platform 4 and an inner platform 7.

The guide wire fixture arrangement 13 is disconnected from the platform 6 in the tower 1 and is lowered to the space below the tower by the hoist system 15.

The guide wire fixture arrangement is then connected to the platform 7 in the foundation 16 by connection means 14.

The platform 6 comprises a railing 12 arranged around the opening for the elevator, and the platform 7 comprises a protection railing 9 to enhance the safety of the personnel working in the wind turbine.

After the connection of the guide wire fixture arrangement 13 to the floor 7 in the foundation 16, the guide wires 11 show the same tension as was adjusted during the preinstallation of the tower on the support arrangement 2. Thus, the guide wires 11 are already adjusted and the elevator system is ready to be used.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A tower for a wind turbine, comprising:
an elevator system, the elevator system including a plurality of guide wires to guide an elevator cabin, the plurality of guide wires being connected to a guide wire fixture arrangement, wherein the elevator cabin includes an elevator frame, the guide wire fixture arrangement being connected to the elevator frame;
a platform that is arranged perpendicular to a longitudinal axis of the tower in an area of a lower end of the tower, the platform including an opening that is prepared and arranged in a way to allow the plurality of guide wires to pass through the opening, wherein the platform comprises a connection mechanism to detachably connect the guide wire fixture arrangement to the platform during transportation and installation of the tower; and
a hoist system operably connected to the platform, the hoist system configured to lower an elevator frame and the guide wire fixture arrangement through the opening in the platform into a space below the tower to extend the plurality of guide wires through the opening in the platform;
wherein, when the guide wire fixture arrangement is raised by the hoist system and connected to the platform, the plurality of guide wires lose tension.

2. The tower according to claim 1, wherein the elevator frame is connected to the guide wire fixture arrangement.

3. The tower according to claim 1, wherein a protection railing is arranged at least partially around the opening in the platform.

4. The tower according to claim 1, wherein the guide wire fixture arrangement comprises a plurality of attachment points that are prepared and arranged in a way to be used with the connection means to attach the guide wire fixture arrangement to a second platform to tension the plurality of guide wires.

5. A method of installing the wind turbine tower of claim 1 on a foundation at an installation, the method comprising the steps of:
preparing the wind turbine tower for transportation to the foundation;
transporting the wind turbine tower to the foundation;
connecting the wind turbine tower to the foundation;
disconnecting the guide wire fixture arrangement from the platform of the tower; and
lowering the guide wire fixture arrangement through the opening in the platform.

6. The method according to claim 5, wherein preparing includes:
temporarily connecting the tower onto a support arrangement; and
connecting the guide wire fixture arrangement to the support arrangement.

7. The method according to claim 5, wherein preparing includes f:
adjusting a length of the plurality of guide wires to achieve a certain predetermined tension of the plurality of guide wires.

8. The method according to claim 5, wherein preparing includes: testing and approving the elevator system of the wind turbine tower.

9. The method according claim 5, wherein transporting includes:
disconnecting the guide wired fixture arrangement from the support arrangement;
hoisting the guide wire fixture arrangement up to the tower by the hoist system; and
attaching the guide wire fixture arrangement to the tower.

10. The method according to claim 5, comprising the additional steps of:
connecting the guide wired fixture arrangement to the foundation.

* * * * *